US008526299B2

(12) United States Patent  
Ni et al.

(10) Patent No.: US 8,526,299 B2
(45) Date of Patent: Sep. 3, 2013

(54) METHOD AND DEVICE FOR PROCESSING CELL OUT-OF-SERVICE FAILURES

(75) Inventors: Hua Ni, Shenzhen (CN); Weihong Zhu, Shenzhen (CN); Yi Shen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 266 days.

(21) Appl. No.: 12/990,774

(22) PCT Filed: Dec. 23, 2009

(86) PCT No.: PCT/CN2009/075876
§ 371 (c)(1),
(2), (4) Date: Nov. 2, 2010

(87) PCT Pub. No.: WO2010/088832
PCT Pub. Date: Aug. 12, 2010

(65) Prior Publication Data
US 2011/0044165 A1   Feb. 24, 2011

(30) Foreign Application Priority Data
Feb. 6, 2009   (CN) .......................... 2009 1 0077987

(51) Int. Cl.
*H04J 1/16* (2006.01)
(52) U.S. Cl.
USPC ........... 370/221; 370/229; 370/241; 370/334; 455/421
(58) Field of Classification Search
USPC ................. 370/229, 241, 216–228, 242–246, 370/331–334, 248, 328; 455/7–10, 432.1–444, 455/421, 422.1, 423–425
See application file for complete search history.

(56) References Cited

U.S. PATENT DOCUMENTS

| 5,920,607 | A | * | 7/1999 | Berg | 379/1.01 |
| 6,141,319 | A | * | 10/2000 | Dighe et al. | 370/218 |
| 6,148,194 | A | * | 11/2000 | Kao et al. | 455/421 |
| 6,173,168 | B1 | * | 1/2001 | Andersson | 455/404.1 |

(Continued)

FOREIGN PATENT DOCUMENTS

| CN | 101026854 A | 8/2007 |
| CN | 101027872 A | 8/2007 |

(Continued)

OTHER PUBLICATIONS

International Search Report in international application No. PCT/CN2009/075876, mailed on Apr. 1, 2010.

(Continued)

*Primary Examiner* — Jeffrey M Rutkowski
*Assistant Examiner* — Rasha Fayed
(74) *Attorney, Agent, or Firm* — Oppedahl Patent Law Firm LLC

(57) ABSTRACT

The present invention discloses a method for processing cell out-of-service failures, which includes: monitoring and receiving cell outage faults; and according to an obtained cell outage fault, automatically attempting to recover the cell when the fault is caused by malfunction of an entity and there is a redundant entity for replacement. The present invention also discloses a device for processing cell out-of-service failures, which comprises a failure monitoring module and an automatic failure recovering module. The present invention can be used to reduce the costs of operation and maintenance, to shorten the time of solving problems, and to improve the efficiency of failure processing.

10 Claims, 3 Drawing Sheets

(56) References Cited

U.S. PATENT DOCUMENTS

| | | | | |
|---|---|---|---|---|
| 6,272,107 | B1* | 8/2001 | Rochberger et al. | 370/216 |
| 6,775,542 | B1* | 8/2004 | Vilander et al. | 455/423 |
| 6,915,127 | B2* | 7/2005 | Sakuma | 455/423 |
| 7,400,895 | B2* | 7/2008 | Chang et al. | 455/502 |
| 7,420,925 | B2* | 9/2008 | Hori et al. | 370/242 |
| 7,515,525 | B2* | 4/2009 | Appanna et al. | 370/217 |
| 2007/0298798 | A1* | 12/2007 | Hagerman et al. | 455/436 |
| 2008/0064361 | A1* | 3/2008 | Bjork et al. | 455/403 |
| 2009/0149180 | A1* | 6/2009 | Kitazoe | 455/436 |
| 2009/0201801 | A1* | 8/2009 | Ono | 370/221 |
| 2009/0285090 | A1* | 11/2009 | Allasia et al. | 370/221 |
| 2009/0286783 | A1* | 11/2009 | Ibrahim et al. | 514/234.2 |
| 2010/0159917 | A1* | 6/2010 | Majmundar et al. | 455/423 |
| 2010/0224888 | A1* | 9/2010 | Norman | 257/84 |
| 2010/0278038 | A1* | 11/2010 | Stahle et al. | 370/216 |
| 2011/0080825 | A1* | 4/2011 | Dimou et al. | 370/216 |
| 2011/0130137 | A1* | 6/2011 | Sanders et al. | 455/424 |

FOREIGN PATENT DOCUMENTS

| | | |
|---|---|---|
| CN | 101106789 A | 1/2008 |
| CN | 101312581 A | 11/2008 |
| JP | 7057157 A | 3/1995 |
| WO | 9724896 A2 | 7/1997 |
| WO | 2008030171 A2 | 3/2008 |
| WO | 2008050388 A1 | 5/2008 |

OTHER PUBLICATIONS

English Translation of the Written Opinion of the International Search Authority in international application No. PCT/CN2009/075876, mailed on Apr. 1, 2010.

Supplementary European Search Report in European application No. 09839549.4, mailed on Feb. 17, 2012.

* cited by examiner

METHOD AND DEVICE FOR PROCESSING CELL OUT-OF-SERVICE FAILURES

TECHNICAL FIELD

The present invention relates to the technologies for processing cell failures in mobile communication networks, and specifically to a method and device for processing cell out-of-service failures.

BACKGROUND

With the rapid advances of mobile communication technologies, various services supported by mobile communication systems are becoming increasingly more and stronger. Currently, in the mobile communication systems, the implementation of all kinds of services depends on the functions of cells; if a cell has a failure, then the services supported by it will not operate normally.

At present, a cell may report an alert in case of a failure, but a cell that may have not reported an alert would be incapable of providing normal service functions. Those circumstances where a cell can not provide normal service due to failure to report an alert are typically identified through monitoring of the cell's performance parameters or user complaints, and then can be converted into cell alerts. Wherein the so-called performance parameter monitoring generally means detecting telephone traffic and related parameters of the cell, and delivering a cell no-traffic or low-traffic notification when the cell's telephone traffic is 0 or lower than a certain set threshold; in this paper, the cell no-traffic or low-traffic notification is collectively called a cell no-traffic notification.

However, no matter what method is used to identify that the cell has quit its normal service functions, it is always necessary to engage professional maintenance personnel to analyze and process the failure, and before such maintenance personnel finishes the processing, all areas covered by the relevant cell is incapable of providing normal service. Generally, the cell's incapability to provide normal service includes several situations: cell out-of-service, cell interruption, and cell anomaly; in this paper, these several situations are collectively called cell out-of-service. As far as processing the cell's quitting normal service using existing technologies is concerned, the existing procedures for processing the cell out-of-service failure have to rely on the level of professional skills of the maintenance personnel, for this reason, this obviously increases the costs of operation and maintenance as well as the time required to solve problems.

SUMMARY

In view of this, the main purpose of the present invention is to provide a method and device for processing cell out-of-service failures, which can reduce the costs of operation and maintenance, shorten the time of solving problems, and improve the efficiency of failure processing.

In order to achieve the above mentioned objective, the technical scheme of the present invention is implemented as such:

a method for processing cell out-of-service failures includes:

monitoring and receiving cell outage faults;

according to an obtained cell outage fault, automatically attempting to recover a cell when the fault is caused by malfunction of an entity and there is a redundant entity for replacement.

Wherein the obtained cell outage fault may be reported by a network element device after detecting a cell failure, or be sent by a network management system after detecting a cell failure, or be converted according to user complaint information, or be generated according to a cell no-traffic notification and a cell state.

In the above mentioned scheme, the process of determining that the fault is caused by malfunction of an entity and there is a redundant entity for replacement may specifically include:

a. analyzing causes and contents of the obtained cell outage fault;

b. determining according to the causes and contents of the fault whether the cell out-of-service is caused due to a malfunction of the entity, if it is a malfunction of the entity, then executing step c; if it is a non-entity malfunction, then attempting to recover the cell, and then ending the current recovering process;

c. checking configuration information, acquiring related entity objects of the current cell, and finding whether there is a fault related to the entity objects; if there is a fault related to the entity, then determining according to the type of the entity whether the entity is replaceable, if there is a replaceable entity, then attempting to recover the cell; if there is no replaceable entity, then ending the current recovering process; if there is no fault related to the entities, then ending the current recovering process.

In the above mentioned scheme, before ending the recovering process when there is no replaceable entity, or before ending the recovering process when there is no fault related to the entities, the method may further include: determining whether the cell requires compensation, if no compensation is required, then recording the result of automatic recovering or reporting the result of processing the fault to an upper level; if compensation is required, then sending a cell blocking request to block the failed cell, backing current configuration parameters of the cell up, generating configuration parameters related to the cell compensation and delivering them to the network element devices, and recording the result of automatic recovering or reporting the result of processing the fault to an upper level.

In the above mentioned scheme, after attempting to recover the cell, the method may further include: determining whether the cell recovering is successful, if successful, then ending the current recovering process; if failed, then determining whether the cell requires compensation, if no compensation is required, then recording the result of automatic recovering or reporting the result of processing the fault to an upper level; if compensation is required, then sending a cell blocking request to block the failed cell, backing current configuration parameters of the cell up, generating configuration parameters related to the cell compensation and delivering them to the network element devices, and recording the result of automatic recovering or reporting the result of processing the fault to an upper level.

In the above mentioned scheme, after the cell failure is recovered, the method may further include: receiving a recovery message of the cell outage fault, and checking whether the cell has been compensated, if it is not compensated, then no processing is necessary; if it has been compensated, then checking the cell state, if the cell state is blocked, then first unblocking the cell, and then generating new configuration parameters according to current parameters of the cell and the backup of original configuration parameters and delivering them to the network element devices; if the cell state is not blocked, then generating new configuration parameters directly according to the current parameters of the cell and the backup of original configuration parameters and delivering them to the network element devices.

In the above mentioned scheme, the method for recovering the cell may be that: deleting the failed cell and attempting to reestablish a cell; or modifying or reassigning related parameters of cell's physical equipment; or allowing the cell to activate spare physical equipment.

The present invention also provides a device for processing a cell out-of-service failure, which comprises: a failure monitoring module and an automatic failure recovering module; wherein the failure monitoring module is used for monitoring and receiving cell outage faults or cell no-traffic notifications, and forwarding obtained cell outage faults to the automatic failure recovering module;

the automatic failure recovering module is used for analyzing the cell outage fault and collected related information, and automatically attempting to recover the cell when the fault is caused by malfunction of an entity and there is a redundant entity for replacement.

Wherein the failure monitoring module may be further connected to a performance monitoring system in the network for receiving cell no-traffic notifications sent by the performance monitoring system; the failure monitoring module may be further connected to a user complaint processing system in the network for receiving cell outage faults converted by the user complaint processing system according to user complaint information; the failure monitoring module may be further connected to a network element device or a network management system in the network for receiving cell outage faults from the network element device or the network management system.

In the above mentioned scheme, the automatic failure recovering module may be further used for automatically activating compensation operation upon failure of the automatic recovering attempt.

The method and device for processing cell out-of-service failures as provided in the present invention automatically monitors the cell outage faults in the system and automatically attempts to recover the cell when having detected a cell outage fault and determined that it is an entity fault and that there is an entity for replacement, thereby being capable of dramatically shortening the time required to solve problems, improving the efficiency of failure processing, and reducing the costs of operation and maintenance.

Upon failure of the recovering, the present invention can further automatically activate the cell compensation operation, generate configuration parameters related to the cell compensation and deliver them to the network element devices, and automatically cancel the cell compensation operation upon recovery of the cell fault. In this way, it can dramatically reduce the influence of the cell out-of-service on users, and improve the users' service satisfaction.

DETAILED DESCRIPTION

The basic idea of the present invention is: automatically monitoring cell outage faults in the system, and attempting to make automatic recovering; furthermore, being capable of automatically activating cell compensation operation upon failure of the automatic recovering.

Figure 1:
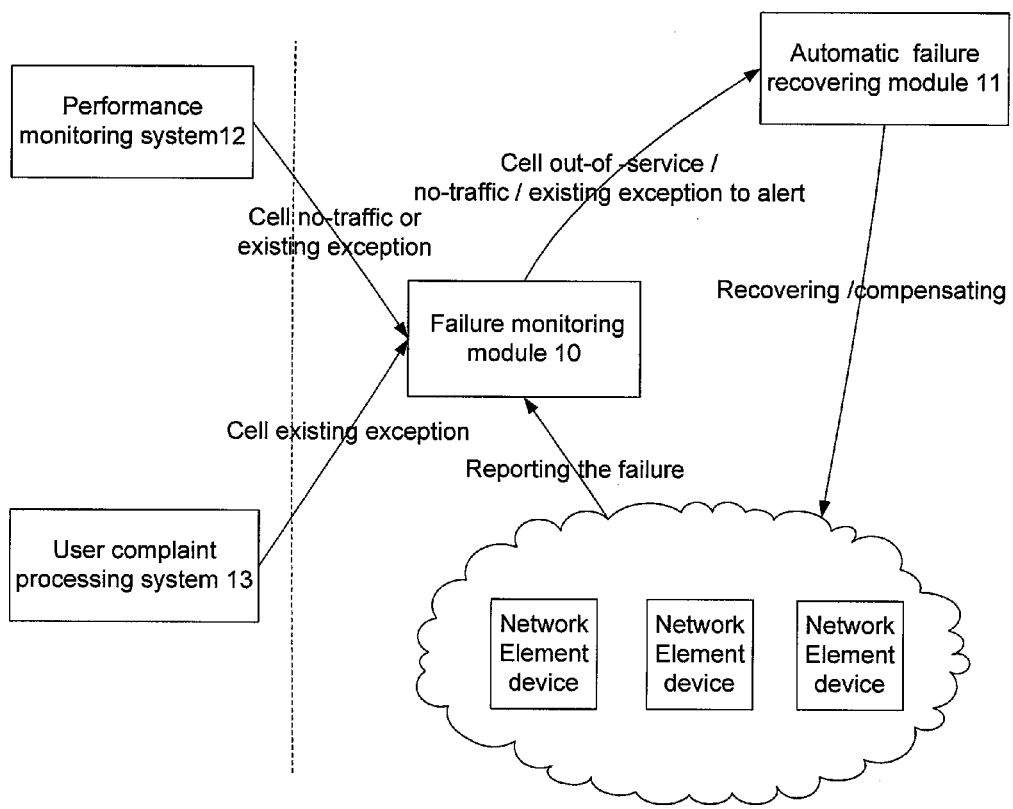
FIG. 1 is a schematic diagram illustrating components and application environments of a device for processing cell out-of-service failures as described in embodiments of the present invention.

FIG. 1 shows components and application environments of a device for processing cell out-of-service failures as described in embodiments of the present invention; as shown in FIG. 1, the device for processing cell out-of-service failures as described in the embodiments of the present invention comprises: a failure monitoring module 10 and an automatic failure recovering module 11; wherein the failure monitoring module 10 is used for monitoring and receiving cell outage faults or cell no-traffic notifications, and forwarding the obtained cell outage faults to the automatic failure recovering module 11;

herein the cell outage fault or the cell no-traffic notification received by the failure monitoring module 10 can come from a network element device or a network management system (NMS), or from a performance monitoring system 12 in the network, or from a user complaint processing system 13 in the network; wherein the network management system is shortened as NMS;

the network element device or the NMS (not shown in FIG. 1) is connected to the failure monitoring module 10, and the network element device or the NMS will generate a cell outage fault once having detected a failure, and report the failure to the failure monitoring module 10;

the performance monitoring system 12 is connected through an interface to the failure monitoring module 10, and can report a cell no-traffic notification, i.e. sending a cell no-traffic notification to the failure monitoring module 10 when the cell has no traffic;

the user complaint processing system 13 is connected through an interface to the failure monitoring module 10, and can report a cell outage fault according to user complaint information received, i.e. being capable of converting the user complaint information, once received, into a cell outage fault and reporting the fault to the failure monitoring module 10;

the failure monitoring module 10 monitors the received fault information and, if it finds a cell outage fault, then it forwards the cell outage fault to the automatic failure recovering module 11.

The automatic failure recovering module 11 is used for analyzing the cell outage fault and related information further collected, and automatically attempting to recover the cell when the fault is caused by malfunction of an entity and there is a redundant entity for replacement; furthermore, it is used for automatically activating cell compensation operation upon failure of the automatic recovering attempt.

According to the application environment in FIG. 1, the method for processing cell out-of-service failures of the present invention includes the following steps:

Step 1: monitoring and receiving cell outage faults.

Herein the monitoring and receiving are accomplished by the failure monitoring module; the cell outage faults may be reported by the network element device after detecting a cell failure, or sent by the NMS after detecting a cell failure, or converted by the user complaint processing system according to user complaint information, or generated according to a cell no-traffic notification and cell state.

Actually, what the failure monitoring module receives may involve two types of messages: cell outage faults and cell no-traffic notifications; the failure monitoring module therefore has to determine the type of the message received, and if it is a cell outage fault, then step 2 will be executed.

If it is a cell no-traffic notification, then the cell state is checked first; if the cell state is unavailable, then the cell outage fault is delivered, and step 3 will be executed; if the cell state is normal, then configuration information is checked and related entity objects of the cell are acquired, and a fault related to the entity objects will be searched for, if there is a fault, then the cell outage fault is delivered, and step 4 will be executed; if there is no fault, then the cell is deemed to be normal, and the current processing flow ends.

During this step, both the determination on the type of the messages and subsequent operation are accomplished by the automatic failure recovering module; the cell outage fault or the cell no-traffic notification is forwarded by the failure monitoring module to the automatic failure recovering module.

Step 2: analyzing the causes and contents of the fault according to the cell outage fault received, and determining according to the causes and contents of the fault whether the cell out-of-service is caused due to any malfunction of the entity, if it is determined to be a malfunction of the entity, then executing step 3 to process the malfunction of the entity; if it is determined to be a non-entity malfunction, then executing step 5.

Step 3: checking configuration information, acquiring related entity objects of the current cell, and finding whether there is a fault related to the entity objects.

This step is accomplished by the automatic failure recovering module.

Step 4: if there is a fault related to the entity, then determining according to the type of the entity whether the entity is replaceable, if there is a replaceable entity, then executing step 5; if there is no replaceable entity, then the cell outage fault is irrecoverable before the entity failure is recovered, so it is necessary to activate cell compensation, step 6 being executed.

If there is no fault related to the entities, then directly executing step 6.

Step 5: attempting to recover the cell; determining whether the cell is successfully recovered, if succeeded, then ending the current automatic recovering process, if failed, then activating cell compensation, step 6 being executed.

Herein to recover the cell can use but is not limited to the following techniques:

a. deleting the failed cell and attempting to reestablish a cell; when reestablishing the cell due to a malfunction of the entity, radio parameters of the cell will follow the parameters of original cell, and those parameters related to physical equipment can be reassigned, to avoid using the failed entities; when reestablishing the cell due to non-entity malfunction, the parameters of original cell can be used; reestablishing a cell can be attempted for multiple times;

b. modifying or reassigning related parameters of the cell's physical equipment;

c. allowing the cell to activate spare physical equipment.

The step can also be implemented by the network element device.

Step 6: determining according to the type of cell and other parameters whether the cell requires compensation, if no compensation is required, then recording the result of automatic recovering or reporting the result of processing the fault to an upper level, and ending the automatic recovering process.

Herein, reporting the result of processing the fault to an upper level can be sending a notification to the NMS at an upper level, which contains recovering attempts made to the cell outage fault so that operators can obtain the result of processing the fault from the NMS when needing to attend to it.

If compensation is required, then first sending a cell blocking request to block the failed cell; backing current configuration parameters of the cell up; then generating configuration parameters related to the cell compensation through a compensation algorithm and delivering them to the network element devices; and recording the result of automatic recovering or reporting the result of processing the fault to an upper level.

Herein the reporting the result of processing the fault to an upper level can be sending a notification to the NMS at an upper level, which contains various recovering attempts and compensation approaches made to the cell outage fault so that the operators can obtain the result of processing the fault from the NMS when needing to attend to it.

The type of cell can be a coverage type of the cell, the type can be used for determining whether the cell requires compensation; for example, if the coverage type only involves capacity addition, then even if no compensation is made, it will not result in any signal blind area, but will only cause a reduced rate of putting a call through.

In actual applications, if the purpose of cell compensation is only to avoid the occurrence of coverage blind areas, then when an area to which the cell belongs involves multi-layer coverage and the current failed cell is not located in top-layer coverage, it is also allowed not to perform the cell compensation, in other words, the step of performing the cell compensation is optional, in this case, the cell out-of-service will result in a reduction of system's capacity to carry service traffic, but will not result in any coverage blind area.

When the cell compensation operation is not performed, the operations in step 4 and step 5 that proceed to step 6 will simply become ending the current recovering process.

Furthermore, the method also, after the maintenance personnel has recovered the cell indicated by the cell outage fault and recorded that the corresponding cell has been compensated, includes the following steps:

After the cell failure is recovered, the failure monitoring module receives a recovery message of the cell outage fault, and forwards the recovery message to the automatic failure recovering module; the automatic failure recovering module will, when having received the recovery message of the cell outage fault, check whether the cell has been compensated, if it is not compensated, then no processing is performed; if it has been compensated, then the cell state will be checked, if the cell state is blocked, then the cell will be unblocked first, subsequently, new configuration parameters will be generated according to the current cell's parameters and the backup of original configuration parameters, and delivered to the network element device, then the cell compensation action will be cancelled.

Generally, after the cell failure is recovered, it can be the fault source of the cell failure such as the network element device that generates the recovery message and sends it to the failure monitoring module; it can also be the NMS that, after detecting the recovery from the failure and the capability to operate normally, acknowledges that the cell failure has been recovered, and thereby generates the recovery message and sends it to the failure monitoring module; it can further be the performance monitoring system that generates the recovery message and sends it to the failure monitoring module.

In actual applications, processing cell recovery from a failure is optional.

The implementation of the technical scheme of the present invention is further described below in details according to the attached drawings and specific embodiments.

Figure 2:
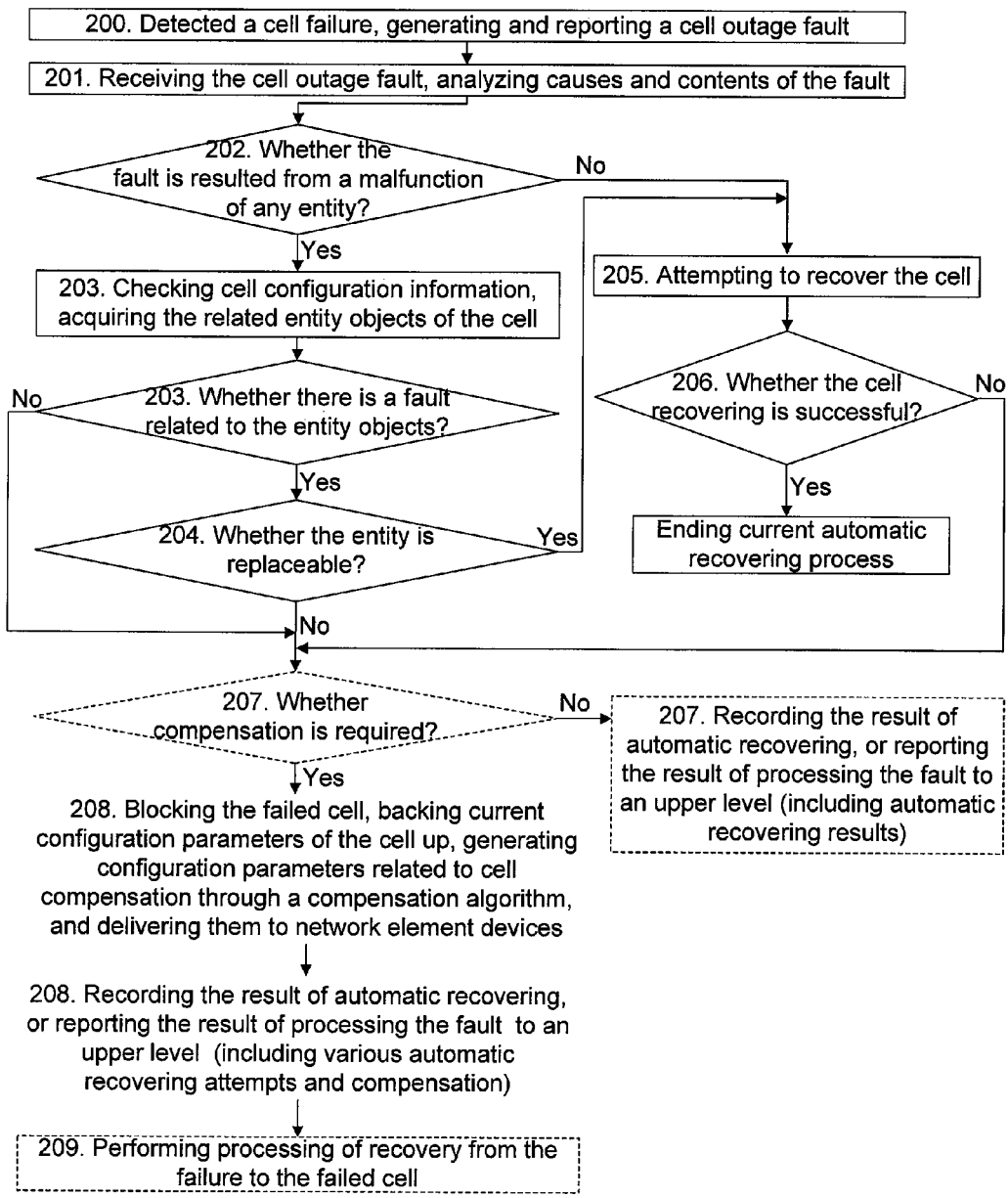
FIG. 2 is a schematic flowchart illustrating the implementation of a processing method for reporting on cell out-of-service failures as described in the first embodiment of the present invention.
Figure 3:
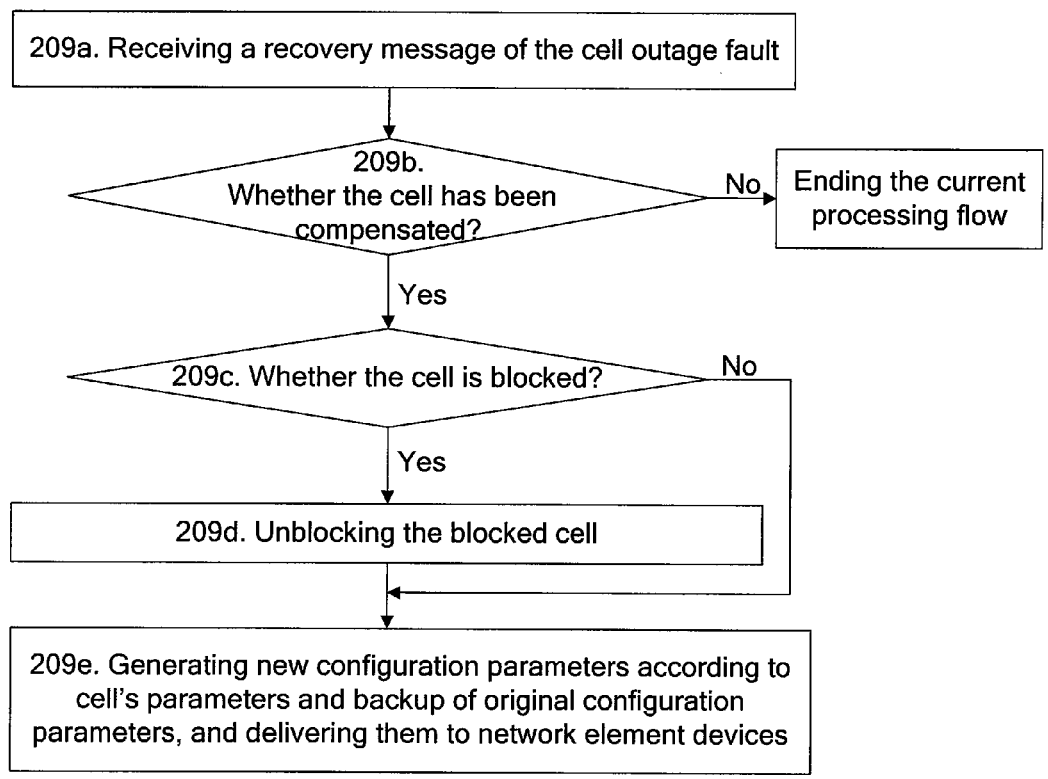
FIG. 3 is a schematic flowchart illustrating the implementation of a processing method for recovering from cell out-of-service failures as described in the first embodiment of the present invention.

Embodiment 1:

In this embodiment, the network element device or the NMS detects a cell failure, and generates and reports a cell outage fault. The method for processing a cell out-of-service failure in this embodiment comprises two parts, i.e. reporting on the cell out-of-service failure and recovering from the cell out-of-service failure, wherein FIG. 2 is an illustration of the processing flow for reporting on the cell out-of-service failure, and FIG. 3 is an illustration of the processing flow for recovering from the cell out-of-service failure. As shown in FIG. 2 and FIG. 3, the method for processing a cell out-of-service failure in this embodiment includes:

Step 200: detecting a cell failure, and generating and reporting a cell outage fault.

Herein it can be the network element device that generates the cell outage fault, and reports it to the failure monitoring module; it can also be the NMS that detects the cell failure, generates the cell outage fault, and reports the cell outage fault to the failure monitoring module.

Steps 201~202: after receiving the cell outage fault, the automatic failure recovering module analyzes the causes and contents of the fault, and determines according to the causes and contents of the fault whether the cause of the cell out-of-service is resulted from a malfunction of any entity, if it is confirmed to be a malfunction of the entity, then step 203 will be executed to process the malfunction of the entity; if it is confirmed to be a non-entity malfunction, then step 205 will be executed.

Herein the cell outage fault is reported by the network element device to the failure monitoring module, and then forwarded by the failure monitoring module to the automatic failure recovering module.

Steps 203~204: the automatic failure recovering module checks the current cell configuration information, acquires related entity objects of the current cell, and finds whether there is a fault related to the entity objects.

If there is a fault related to the entity, then according to the type of the entity, whether the entity is replaceable will be determined, if there is a replaceable entity, then step 205 will be executed; if there is no replaceable entity, then the cell outage fault is irrecoverable before the entity failure is recovered, and it is necessary to activate cell compensation and execute step 207.

If there is no fault related to the entities, then step 207 will be executed directly.

Step 205: attempting to recover the cell.

Herein the cell recovering can use but is not limited to the following techniques:

(1) deleting the failed cell and attempting to reestablish a cell; when reestablishing the cell due to malfunction of the entity, radio parameters of the cell will follow the parameters of original cell, those parameters related to physical equipment can be reassigned, and the use of failed entities should be avoided; when reestablishing the cell due to non-entity malfunction, the parameters of the original cell can be used; reestablishing a cell can be attempted for multiple times;

(2) modifying or reassigning related parameters of the cell's physical equipment;

(3) allowing the cell to activate spare physical equipment. The step can also be implemented by the network element device.

Step 206: determining whether the cell recovering is successful, if successful, then ending the current automatic recovering process; if failed, then it is necessary to activate cell compensation, and step 207 will be executed.

Herein the recovering may be reestablishing a cell or, modifying or reassigning cell parameters, or activating the spare physical equipment.

Step 207: determining according to the type of cell and other parameters whether the cell requires compensation, if no compensation is required, then recording the result of automatic recovering or reporting the result of processing the fault to an upper level, and then ending the current automatic recovering process; if the compensation is required, then executing step 208.

Herein the reporting the result of processing the fault to an upper level may be sending a notification to the NMS at an upper level, which contains various recovering attempts made to the cell outage fault so that the operators can obtain the fault processing result from the NMS when needing to attend to it.

Step 208: sending a cell blocking request to block the failed cell, and backing current configuration parameters of the cell up before recovering; generating configuration parameters related to the cell compensation through a compensation algorithm, and delivering them to the network element devices.

Recording the result of automatic recovering or reporting the result of processing the fault to an upper level, herein reporting the result of processing the fault to an upper level can be sending a notification to the NMS at an upper level, which contains recovering attempts and compensation approaches made to the cell outage fault so that the operators can obtain the result of processing the fault from the NMS when needing to attend to it.

After recovering the cell indicated by the cell outage fault, the maintenance personnel will record that the cell has been compensated. Accordingly, after the cell recovers to normal, the method further includes step 209: performing the processing of recovering from the failure to the failed cell; as shown according to FIG. 2, step 209 specifically includes the following steps:

step 209a: after the cell failure is recovered and recovers to normal, the failure monitoring module receives a recovery message of the cell outage fault;

herein the recovery message of the cell outage fault can be generated and reported to the failure monitoring module by the network element device, or generated by the NMS after detecting the recovery from the failure and sent to the failure monitoring module. After that, the recovery message is then forwarded by the failure monitoring module to the automatic failure recovering module;

step 209b: the automatic failure recovering module checks according to the received recovery message of the cell outage fault whether the cell has been compensated, if it is not compensated, then no processing is necessary, and the current processing flow ends; if it has been compensated, then step 209c will be executed;

steps 209c~209d: checking the cell state, determining whether the cell is blocked, if the cell state is blocked, then first unblocking the cell, and executing step 209e; if the cell is not blocked, then directly executing step 209e;

step 209e: generating new configuration parameters according to the current cell's parameters and the backup of original configuration parameters and delivering them to the network element devices, and cancelling the cell compensation operation.

Herein the cell parameters can be power-related parameters or other cell parameters; how to generate new configuration parameters according to cell parameters and the backup of original configuration parameters would involve different generation methods according to different algorithms being adopted or different implementation methods according to different manufacturers, the specific implementation of this can adopt existing techniques, and will be no longer elaborated here.

Embodiment 2:

In this embodiment, the performance monitoring system detects that the cell has no traffic. The method for processing cell outage faults in this embodiment comprises two parts, i.e. reporting on a cell outage fault failure and recovering from a cell outage fault failure, and the method for processing cell outage faults in this embodiment includes:

Step 200': the performance monitoring system detects that the cell has no traffic, and notifies the failure monitoring module.

Herein, the performance monitoring system can statistically calculate the cell's telephone traffic according to the performance data reported by the network element devices, when the cell's telephone traffic is 0 or lower than a certain preset threshold, it means that the cell may enter a sleep mode or exist exception, at this moment, the performance monitoring system notifies the failure monitoring module that the cell has no traffic.

Step 201': the failure monitoring module receives the cell no-traffic notification and sends it to the automatic failure recovering module; the automatic failure recovering module executes step 202' or 204' according to the specific situation of cell having no-traffic.

Herein the cell having no-traffic may mean that the cell exists exception, or that the cell is normal, but there is really no traffic happening.

In order to distinguish the above mentioned two situations, the automatic failure recovering module first checks the cell state, if the cell state is unavailable, then it means that the cell exists exception, therefore a cell outage fault will be delivered, after that, the automatic failure recovering module analyzes the causes and contents of the fault, and step 202' will be executed;

if the cell state is normal, then the related entity objects of the cell will continue to be acquired and whether there is a fault related to these entity objects will be checked, if there is no fault related to these entity objects, then it can be deemed that the cell is normal, and the current processing flow ends; if there is a fault to any entity object, then the cell outage fault will be delivered, and step 204' will be executed.

Steps 202'-209': they are basically the same as steps 202 to 209 in Embodiment 1, except that during the processing in step 209', it is the performance monitoring system that generates the recovery message of the cell outage fault and sends it to the failure monitoring module, and then it is the failure monitoring module that forwards the recovery message to the automatic failure recovering module.

Embodiment 3:

In this embodiment, the user complaint processing system receives the user complaint information. The method for processing a cell outage fault in this embodiment comprises two parts, i.e. reporting on a cell outage fault failure and recovering from a cell outage fault failure, and the method for processing a cell outage fault in this embodiment includes:

Step 200'': after determining according to the received user complaint information that the cell exists exception, the user complaint processing system reports a cell outage fault to the failure monitoring module.

Herein according to the user complaint information, the user complaint processing system can roughly determine the cause of the failure and can, according to the location, find out the cell that may have a failure, then it will report a cell outage fault if the finding result indicates that the cell exists exception.

Steps 201''~209'': they are the same as steps 201 to 209 in Embodiment 1.

The present invention can automatically monitor cell outage faults in the system, and attempt to recover the cell automatically; and upon failure of the automatic recovering, it can further automatically activate cell compensation, and will automatically cancel the cell compensation operation upon recovery of cell faults. In this way, it can dramatically reduce the impact of cell out-of-service on users.

The above mentioned are just the preferred embodiments of the present invention and are in no way intended to restrict the scope of protection of the present invention; any and all modifications, equivalent substitutes, and improvements, etc, made within the spirit and principle of the present invention shall all be included into the scope of protection of the present invention.

The invention claimed is:

1. A method for processing cell out-of-service failures, the method including:
monitoring and receiving cell outage faults;
analyzing causes and contents of the received cell outage fault;
determining according to the causes and contents of the fault whether the cell out-of-service is caused due to a malfunction of any hardware; when it is a non-hardware malfunction, then attempting to recover the cell, and then ending the cell recovering process; when it is a malfunction of the hardware, then checking configuration information, acquiring related hardware objects of the current cell, and finding whether there is a fault related to a hardware object; when there is a fault related to the hardware object, then determining according to the type of the hardware object whether the hardware object is replaceable; when there is a replaceable hardware object, then attempting to recover the cell; when there is no replaceable hardware object, or if there is no fault related to the hardware object, or the recovering attempt fails, determining, according to a coverage type of the cell, whether the cell requires compensation; when no compensation is required, then recording the result of automatic recovering or reporting the result of processing the fault to an upper level; when compensation is required, then sending a cell blocking request to block the failed cell, backing current configuration parameters of the cell up, then generating configuration parameters related to the cell compensation and delivering them to the network element devices, and recording the result of automatic recovering or reporting the result of processing the fault to an upper level, and then ending the current recovering process,
wherein the determining, according to the coverage type of the cell, whether the cell requires compensation includes: if making no compensation would result in a signal blind area, determining that cell requires compensation; otherwise, determining that the cell does not require compensation.

2. The processing method according to claim 1, wherein the obtained cell outage fault is reported by a network element device after detecting a cell failure, or is sent by a network management system after detecting a cell failure, or is converted according to user complaint information, or is generated according to a cell no-traffic notification and a cell state.

3. The processing method according to claim 1, wherein after attempting to recover the cell, the method further including:
determining whether the cell recovering is successful, if successful, then ending the current recovering process; if failed, then determining whether the cell requires compensation, if no compensation is required, then recording the result of automatic recovering or reporting the result of processing the fault to an upper level; if compensation is required, then sending a cell blocking request to block the failed cell, backing current configuration parameters of the cell up, generating configuration parameters related to the cell compensation and delivering them to the network element devices, and recording the result of automatic recovering or reporting the result of processing the fault to an upper level.

4. The processing method according to claim 3, wherein after the cell failure is recovered, the method further including:
receiving a recovery message of the cell outage fault, and checking whether the cell has been compensated, if it is not compensated, then no processing is necessary; if it has been compensated, then checking the cell state, if the cell state is blocked, then first unblocking the cell, and then generating new configuration parameters according to current cell parameters and the backup of original configuration parameters and delivering them to the network element devices; if the cell state is not blocked, then generating new configuration parameters directly according to the current cell parameters and the backup of original configuration parameters and delivering them to the network element devices.

5. The processing method according to claim 1, wherein the method for recovering the cell is: deleting the failed cell and attempting to reestablish a cell; or modifying or reassigning related parameters of cell's physical equipment; or allowing the cell to activate spare physical equipment.

6. The processing method according to claim 2, wherein the method for recovering the cell is: deleting the failed cell and attempting to reestablish a cell; or modifying or reassigning related parameters of cell's physical equipment; or allowing the cell to activate spare physical equipment.

7. The processing method according to claim 3, wherein the method for recovering the cell is: deleting the failed cell and attempting to reestablish a cell; or modifying or reassigning related parameters of cell's physical equipment; or allowing the cell to activate spare physical equipment.

8. The processing method according to claim 4, wherein the method for recovering the cell is: deleting the failed cell and attempting to reestablish a cell; or modifying or reassigning related parameters of cell's physical equipment; or allowing the cell to activate spare physical equipment.

9. A device for processing cell out-of-service failures, the device comprising: a failure monitoring module and an automatic failure recovering module; wherein the failure monitoring module, in one or more processors, being used for monitoring and receiving cell outage faults or cell no-traffic notifications, and forwarding obtained cell outage faults to the automatic failure recovering module;
the automatic failure recovering module is used for analyzing causes and contents of the obtained cell outage fault; determining according to the causes and contents of the fault whether the cell out-of-service is caused due to a malfunction of any hardware object; if it is a non-hardware malfunction, then attempting to recover the cell, and then ending the current recovering process;
if it is a malfunction of the hardware object, then checking configuration information, acquiring related hardware object of the current cell, and finding whether there is a fault related to the hardware object; if there is a fault related to the hardware object, then determining according to the type of the hardware object whether the hardware object is replaceable; if there is a replaceable hardware object, then attempting to recover the cell; if there is no replaceable hardware object, or if there is no fault related to the hardware object, or the recovering attempt fails,, determining, according to a coverage type of the cell, whether the cell requires compensation; if no compensation is required, then recording the result of automatic recovering or reporting the result of processing the fault to an upper level; if compensation is required, then sending a cell blocking request to block the failed cell, backing current configuration parameters of the cell up, then generating configuration parameters related to the cell compensation and delivering them to the network element devices, and recording the result of automatic recovering or reporting the result of processing the fault to an upper level, and then ending the current recovering process,
wherein the determining, according to the coverage type of the cell, whether the cell requires compensation includes: if making no compensation would result in a signal blind area, determining that cell requires compensation; otherwise, determining that the cell does not require compensation.

10. The processing device according to claim 9, wherein the failure monitoring module is further connected to a performance monitoring system in a network for receiving cell no-traffic notifications sent by the performance monitoring system;
the failure monitoring module is further connected to a user complaint processing system in the network for receiving cell outage faults converted by the user complaint processing system according to user complaint information; and
the failure monitoring module is further connected to network element devices or a network management system in the network for receiving cell outage faults from the network element device or the network management system.

* * * * *